United States Patent
Vidal et al.

(10) Patent No.: US 12,531,287 B2
(45) Date of Patent: Jan. 20, 2026

(54) APPARATUS AND METHOD FOR INSPECTING A SECONDARY CELL

(71) Applicant: VERKOR, Grenoble (FR)

(72) Inventors: Delphine Vidal, Grenoble (FR); Drew Heilman, Grenoble (FR); Jeong Hyun Kim, Grenoble (FR)

(73) Assignee: VERKOR, Grenoble (FR)

( * ) Notice: Subject to any disclaimer, the term of this patent is extended or adjusted under 35 U.S.C. 154(b) by 0 days.

(21) Appl. No.: 18/996,271

(22) PCT Filed: Jul. 18, 2023

(86) PCT No.: PCT/FR2023/051110
§ 371 (c)(1),
(2) Date: Jan. 17, 2025

(87) PCT Pub. No.: WO2024/018151
PCT Pub. Date: Jan. 25, 2024

(65) Prior Publication Data
US 2025/0260080 A1    Aug. 14, 2025

(30) Foreign Application Priority Data
Jul. 19, 2022 (FR) .................................... 2207370

(51) Int. Cl.
*H01M 10/48* (2006.01)
*G01R 31/382* (2019.01)
*H01M 10/04* (2006.01)

(52) U.S. Cl.
CPC ........ *H01M 10/486* (2013.01); *G01R 31/382* (2019.01); *H01M 10/0481* (2013.01)

(58) Field of Classification Search
CPC ............ G01R 19/16542; G01R 31/392; G01R 31/396; H01M 10/4228; H01M 10/4285
See application file for complete search history.

(56) References Cited

U.S. PATENT DOCUMENTS 6,061,639 A * 5/2000 Wistrand ............. G01R 31/396
340/636.15
11,462,777 B2 * 10/2022 Yonekura .......... H01M 10/4207
(Continued)

FOREIGN PATENT DOCUMENTS

DE       102020005411 A1    11/2020
EP           2833434 A1     2/2015
(Continued)

OTHER PUBLICATIONS

European Notification under rule 71(3) EPC for Application No. 23 749 131.1, dated Dec. 12, 2024, 9 pages, English translation.
(Continued)

*Primary Examiner* — Minh N Trinh
(74) *Attorney, Agent, or Firm* — CANTOR COLBURN LLP (57) ABSTRACT

An inspection apparatus for inspecting at least one secondary cell includes a fixed support part; a movable part; and pressing parts that are installed between the support part and the movable part. The pressing parts are freely movable along the main axis, two adjacent pressing parts defining a space (120) for accommodating a secondary cell. Each pressing part that is in contact with the at least one secondary cell has a temperature sensor, the temperature sensor being intended to measure the temperature of the at least one secondary cell which is subjected to a pressure between the pressing parts. An inspection method for inspecting at least one secondary cell is related to the inspection apparatus.

10 Claims, 4 Drawing Sheets

(56) References Cited

U.S. PATENT DOCUMENTS

2014/0123472 A1* 5/2014 Iwase ............... H01M 10/0468
29/593
2021/0184272 A1* 6/2021 Kwak ............... H01M 10/4228

FOREIGN PATENT DOCUMENTS

| EP | 3415938 A1 | 12/2018 |
| EP | 3428670 A1 | 1/2019 |
| EP | 3683589 A1 | 7/2020 |

OTHER PUBLICATIONS

International Search Report for Application No. PCT/FR2023/051110, dated Oct. 9, 2023, 2 pages.

Written Opinion for Application No. PCT/FR2023/051110, dated Oct. 9, 2023, 3 pages.

* cited by examiner

APPARATUS AND METHOD FOR INSPECTING A SECONDARY CELL

CROSS-REFERENCE TO RELATED APPLICATIONS

This application is a 35 U.S.C. § 371 National Stage patent application of PCT/FR2023/051110 filed 18 Jul. 2023, which claims the benefit of French patent application FR2207370 filed 19 Jul. 2022, the disclosures of which are incorporated herein by reference in their entirety.

TECHNICAL FIELD

The present disclosure concerns the field of detecting defects in a secondary cell, in particular the present disclosure concerns an inspection apparatus and method for inspecting at least one secondary cell.

BACKGROUND

When manufacturing secondary cells, namely electric batteries that can be charged, discharged in an electric charge, and recharged many times, and in particular flexible bags of secondary cells, the contamination of the secondary cell is a frequently encountered problem. This contamination can be, for example, caused by a metal particle or a burr that remains on the surface of an electrode inside the secondary cell.

Indeed, in lithium-ion battery cells, the undesirable presence of contamination between two electrodes can cause an internal short circuit inside the lithium-ion battery, leading to failure, damage and, in severe cases, ignition of the battery.

This contamination is particularly difficult to detect in secondary cells. Many attempts have been made to solve this problem. For example, the document EP3415938 A1 describes a technique for detecting a low voltage defect that may occur in a secondary cell, comprising a step of assembling a secondary battery, a step of aging the assembled secondary cell, a step of charging the aged secondary cell, and a step of detecting a defect in the secondary cell. If the secondary cell has a voltage drop greater than its normal self-discharge rate, a low voltage defect is considered to occur in the secondary cell.

However, the technique described in the document EP3415938 A1 requires a considerable amount of time due to the involved long aging steps. Furthermore, the described technique does not take into account the influence of temperature variation on the measured parameters.

The present disclosure provides and apparatus and method to inspect accurately, easily and quickly whether a contaminant is present inside a secondary cell.

SUMMARY

To this end, the disclosure relates to an inspection apparatus for inspecting at least one secondary cell, the inspection apparatus comprising:
- a fixed support element;
- a movable element installed to face the support element and being movable relative to the support element along a main axis in a first direction towards the support element and a second direction opposite the first direction, each direction being along the main axis;
- pressing elements installed between the support element and the movable element, said pressing elements being freely movable along the main axis, two adjacent pressing elements defining a space intended to receive a secondary cell;
- a drive unit configured to operate in a first state in which the drive unit presses the at least one secondary cell which is located between the pressing elements on both sides, and a second state in which the drive unit releases the at least one secondary cell;
- a pressure measuring unit configured to measure the pressure applied by the drive unit;
- a current control unit comprising a power source configured to apply a voltage to the at least one secondary cell and a current measuring unit for measuring a corresponding current through the at least one secondary cell;
- each pressing element that is in contact with the at least one secondary cell comprises a temperature sensor, the temperature sensor being intended to measure the temperature of the at least one secondary cell that is subjected to a pressure between the pressing elements; the inspection apparatus comprising a current correction unit for correcting the current measured by the current measuring unit in order to take into account a temperature value of the at least one secondary cell measured by the temperature sensor.

According to an embodiment of the disclosure, the inspection apparatus further comprises a guide member configured to guide each pressing element to be displaced along the main axis freely in the first direction and in the second direction so as to adjust the gap separating two adjacent pressing elements.

According to an embodiment of the disclosure, the temperature sensor comprises one of the following elements: a thermocouple, a resistance temperature detector, a thermistor, an integrated circuit temperature sensor.

According to an embodiment of the disclosure, the temperature sensor has a resolution comprised between 0.05° C. and 0.5° C.

According to an embodiment of the disclosure, the temperature sensor has an operating temperature range comprised between 5° C. and 120° C.

According to an embodiment of the disclosure, the power source is capable of applying a voltage to reach a voltage value with respect to the at least one secondary cell pressurized by the pressing element.

According to an embodiment, the inspection apparatus comprises an electrode module connected to each of the electrode terminals of the at least one secondary cell to thereby apply or receive current.

According to an embodiment, the current correction unit is configured to correct the current measured by the current measuring unit based on a current or voltage calibration curve.

According to an embodiment, the inspection apparatus comprises a controller which is connected to the pressure drive unit, the electrode module and the current correction unit, respectively, to control the pressurization and release operation of the pressure drive unit, and to determine whether or not there is a defect in the at least one secondary cell by comparing the corrected current value given by the current correction unit and a reference current value.

According to an embodiment, the inspection apparatus comprises a frame intended to be installed on a support, the support element being installed so as to be perpendicular to the frame, the frame comprising a chassis resting on the support and a pair of support frames provided on either side of the chassis to face each other, and wherein:

the pressure measuring unit comprises a pressure sensor interposed between a fixed element fastened to face the support element and the support frame provided on one side of the chassis, the pressure sensor being configured to measure a pressure when the pressing elements pressurize the at least one secondary cell when the drive unit is in its first operating state.

According to an embodiment, the pressure measuring unit comprises a pressure sensor comprised between two adjacent pressing elements among the pressing elements.

According to an embodiment, the space is intended to receive a single secondary cell.

According to an embodiment, the movable element is movable in translation in the first direction and the second direction, between a first position corresponding to the first state and a second position corresponding to the second state.

The disclosure also relates to an inspection method for inspecting at least one secondary cell, the inspection method comprising the following steps:

providing an inspection apparatus as previously described;

providing the at least one secondary cell to be inspected;

introducing the at least one secondary cell into the inspection apparatus such that the at least one secondary cell is introduced between two adjacent pressing elements;

applying a pressure to and releasing the at least one secondary cell between the pressing elements on both sides by displacing the movable element relative to the support element along a main axis in a first direction and a second direction opposite each other along the main axis;

measuring the pressure applied to the at least one secondary cell using the pressure measuring unit in order to determine whether the pressure applied is within a predefined pressure range;

applying a voltage to the at least one secondary cell and measuring a corresponding current through the at least one secondary cell;

measuring the temperature of the at least one secondary cell with a temperature sensor comprised in each pressing element that is in contact with the at least one secondary cell that is pressurized by the pressing elements;

correcting a value of the measured current by taking into account the measured temperature value of the at least one secondary cell by the temperature sensor;

comparing the corrected current value with a reference current value;

sorting at least one secondary cell as functional or defective based on the comparison between the corrected current value and the reference current value such that:

if the corrected current value exceeds the reference current value, the at least one secondary cell is considered defective, if the corrected current value is lower than the reference current value, the at least one secondary cell is considered functional.

According to an embodiment, the step of providing the at least one secondary cell comprises the following sub-steps:

assembling a first electrode and a second electrode and a separator interposed between the first electrode and the second electrode in order to create a bobbin or a stack;

placing the bobbin or the stack in a package or a bag;

filling the package or the bag with an electrolyte;

hermetically sealing the package or the bag in order to obtain the at least one secondary cell, charging the at least one secondary cell to a predetermined state of charge in order to form a solid electrolyte interphase on the surface of the first electrode before placing the at least one secondary cell in the inspection apparatus.

BRIEF DESCRIPTION OF THE DRAWINGS

The disclosure will now be described, only by way of example, with reference to the accompanying figures, in which.

In these figures, the same reference numerals are used to designate the same elements. For reasons of clarity, the figures are not necessarily reproduced to scale. Additional features may emerge from the following description.

DETAILED DESCRIPTION OF THE DRAWINGS

The disclosure concerns an inspection apparatus 1 for inspecting at least one secondary cell 110 which may be a bag of cells for example.

Figure 1:
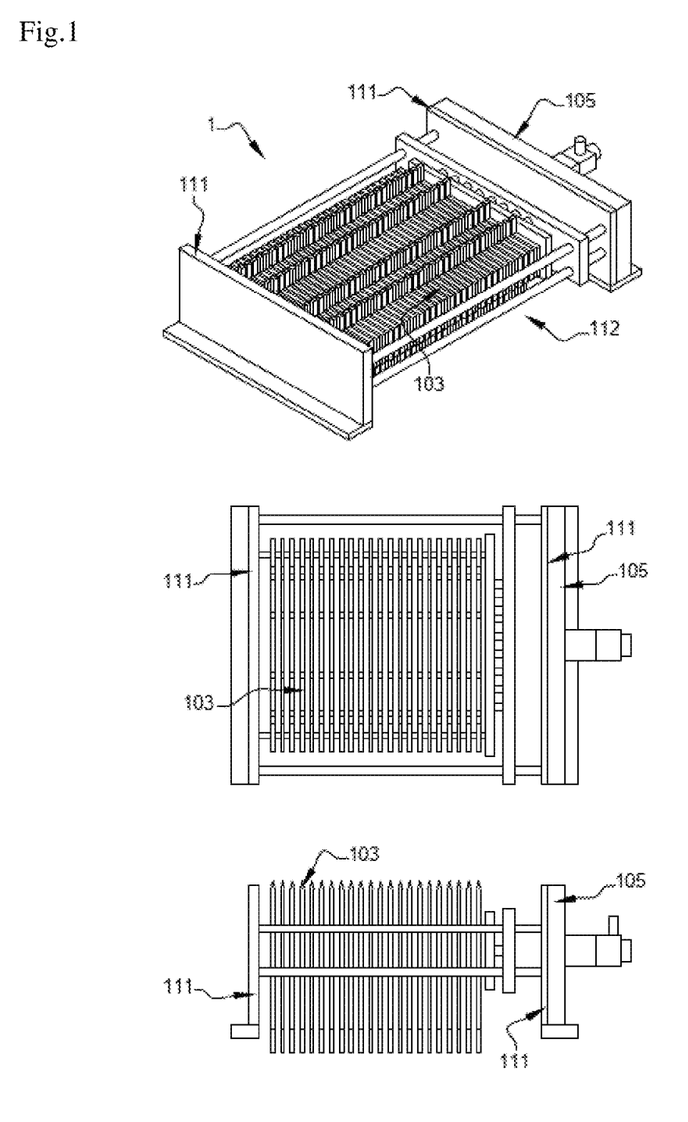
FIG. 1 is a perspective view, a top view and a side view of an inspection apparatus according to the disclosure.
Figure 2:
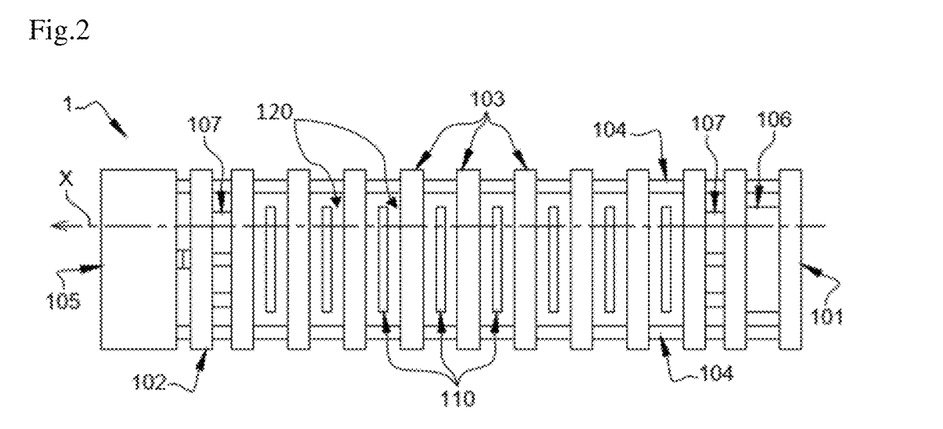
FIG. 2 is a cross-sectional view of the inspection apparatus according to FIG. 1.

The inspection apparatus 1 is shown in FIG. 1 and FIG. 2 and comprises a fixed support element 101.

The support element 101 may be installed so as to be perpendicular to a frame intended to be installed on a support, and the frame may comprise a chassis 112 resting on the support and a pair of support frames 111 provided on either side of the chassis 112 to face each other.

The inspection apparatus 1 also comprises a movable element 102 installed to face the support element 101 and which is movable relative to the support element 101 along a main axis X in a first direction towards the support element 101 and a second direction opposite the first direction, each direction being along the main axis X.

The first direction is defined as the direction in which the movable element 102 approaches the support element 101 and the second direction is defined as the direction in which the movable element 102 moves away from the support element 101.

The inspection apparatus also comprises pressing elements 103 installed between the support element 101 and the movable element 102 and freely movable along the main axis X. Two adjacent pressing elements 103 define a space 120 intended to receive a secondary cell 110.

The space 120 is intended to receive a single secondary cell 110. By receiving only a single secondary cell, it is possible to perform precise measurements on the cell 110.

The pressing elements 103 may in particular be pressure panels which can be installed in parallel between the support element 101 and the movable element 102.

The inspection apparatus 1 also comprises:
- a guide element 104 configured to guide each pressing element 103 to be displaced along the main axis X freely in the first direction and in the second direction so as to adjust the space 120 separating two adjacent pressing elements 103;
and
- a drive unit 105 configured to operate in a first state in which the drive unit 105 presses the at least one secondary cell 110 which is located between the pressing elements 103 on both sides, and in a second state in which the drive unit 105 releases the at least one secondary cell 110,
- a change of operation between the first state and the second state being achieved by displacing the movable element 102 in the first direction and in the second direction;
- a pressure measuring unit configured to measure the pressure applied by the drive unit 105.

Advantageously, the guide element 104 makes it possible to obtain substantially parallel plates, making it possible to obtain usable pressure measurements.

According to an embodiment, the pressure measuring unit comprises a pressure sensor 106 interposed between a fixed element fastened to face the support element 101 and the support frame provided on one side of the chassis 112, and the pressure sensor 106 can be configured to measure a pressure when the pressing elements 103 pressurize the at least one secondary cell 110 when the drive unit 105 is in its first operating state.

According to an embodiment, the pressure measuring unit comprises a pressure sensor comprised between two adjacent pressing elements among the pressing elements 103, and the pressure sensor 106 can be a load cell, a strain gauge, a force-sensitive resistor or a combination of all the cited pressure sensors.

The inspection apparatus 1 may further comprise an elastic support unit configured to elastically support the support element 101 to be brought back to the pressing element side, wherein the elastic support unit may comprise a fixed element fastened to face the support element 101 and a compression spring 107 inserted into the guide member 104 so as to be positioned between the fixed element and the support element 101.

Figure 3:
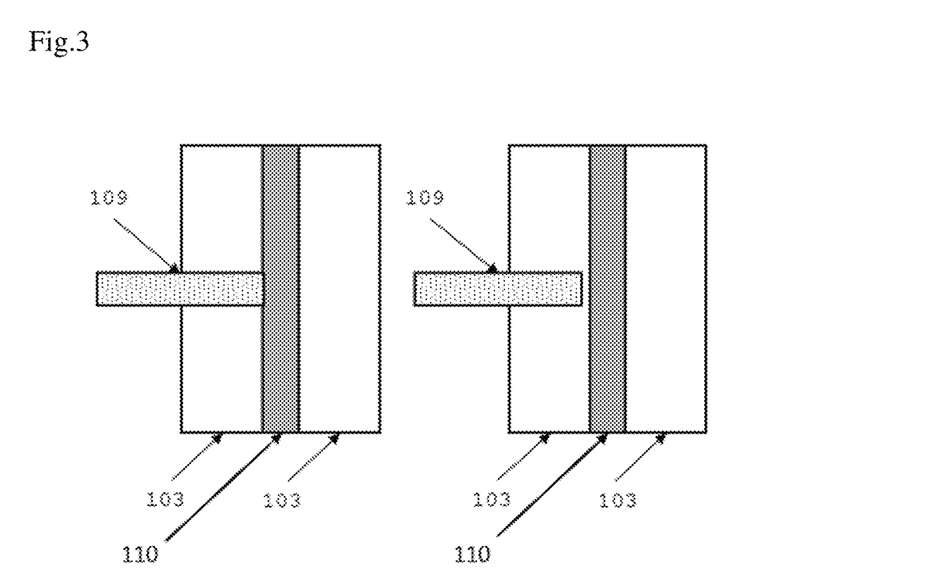
FIG. 3 is an exploded view showing the interior of a pressing element comprised in the inspection apparatus and configured to pressurize at least one secondary cell.
Figure 4:
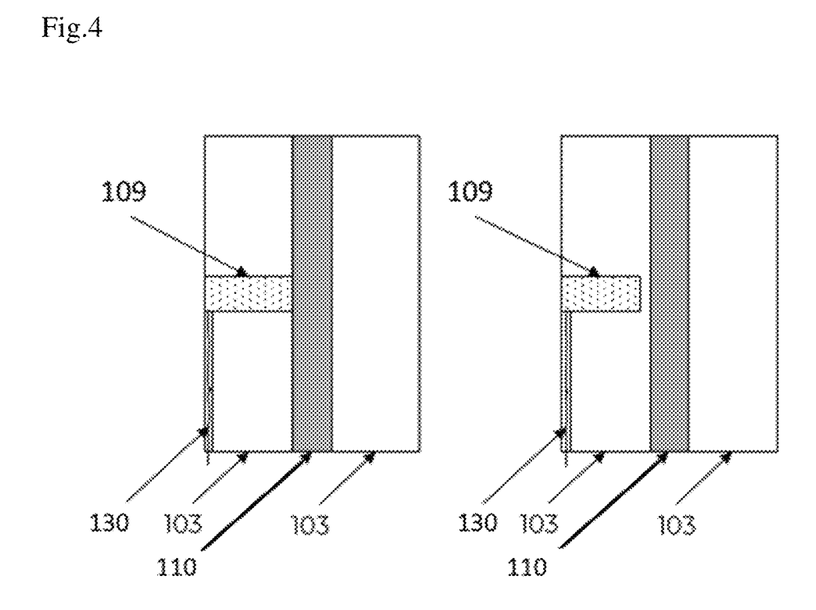
FIG. 4 is a top cross-sectional view of another embodiment of the pressing element of FIG. 3 comprising cable conduit incorporated in the pressing element.

The inspection apparatus is remarkable in that each pressing element 103 which is in contact with the at least one secondary cell 110, comprises a temperature sensor 109 as can be seen in FIG. 3 and FIG. 4. The temperature sensor 109 is intended to measure the temperature of the at least one secondary cell 110 which is pressurized between the pressing elements 103.

According to an embodiment, the temperature sensor 109 comprises one of the following elements: a thermocouple, a resistance temperature detector, a thermistor, an integrated circuit temperature sensor, and the temperature sensor 109 has a resolution comprised between 0.05° C. and 0.5° C.

According to an embodiment illustrated in FIG. 4, a cable conduit 130 is connected to the temperature sensor 109 and the cable conduit 130 and the temperature sensor 109 are both embedded in the pressing element 103. This advantageously makes it possible to measure the temperature value while avoiding excess thickness.

This resolution range makes it possible to accurately detect the temperature of at least one secondary cell 110.

The temperature sensor 109 may have an operating temperature range comprised between 5° C. and 120° C.

Advantageously, this operating temperature range is adapted to the operating conditions of the inspection apparatus 1.

The inspection apparatus 1 further comprises a current control unit configured to apply a voltage to the at least one secondary cell 110 and to measure a corresponding current through the at least one secondary cell 110.

The current control unit may comprise:
- an power source for applying a voltage to reach a predetermined voltage value relative to the at least one secondary cell 110 pressurized by the pressing elements 103; and
- a current measuring unit for measuring a current value flowing through the at least one secondary cell 110.

Advantageously, the current control unit performs a control of the current of the at least one pressurized secondary cell 110, which makes it possible to measure the current flowing through the at least one secondary cell 110.

The current control unit applies a predetermined voltage to the at least one secondary cell 110, and measures the current of the at least one secondary cell 110.

The inspection apparatus 1 may further comprise an electrode module connected to each of the electrode terminals of the at least one secondary cell 110 to thereby apply or receive current.

The inspection apparatus 1 may further comprise a current correction unit for correcting the current measured by the current measuring unit in order to take into account a temperature value of the at least one secondary cell 110 measured by the temperature sensor 109.

The current correction unit is configured to correct the current measured by the current measuring unit on the basis of a current or voltage calibration curve.

The calibration curve may be an abacus which gives predefined current or voltage values for the at least one secondary cell 110 as a function of the temperature of the at least one secondary cell 110. These predefined current and voltage values may be determined experimentally.

These values may vary based on feedback and data collection, after production and inspection of a number of secondary cells.

The term correction of the measured current means that the value of the current measured by the current control unit is erroneous due to the dependence of the measured current on the temperature, and that this value is analyzed by the current correction unit taking into account the dependence of the measured current on the temperature, in order to give a corrected current value which takes into account the dependence of the current on the temperature. This corrected current value is compared to the reference current value.

According to another embodiment, the measured current value is compared to a corrected reference current value, which means that, for each temperature value, the reference current value would be different.

The inspection apparatus 1 further comprises a controller which is connected to the pressure drive unit, the electrode module and the current correction unit, respectively, for controlling the pressurization and release operation of the pressure drive unit, and for determining whether there is a defect in the at least one secondary cell 110 by comparing the corrected current value given by the current correction unit and a reference current value.

The controller can determine whether there is a defect by comparing an average value of the current values measured by the current control unit with the reference value during a predetermined time period which may depend on the user-controlled parameters of the inspection apparatus.

The predetermined time period may be 1 to 30 seconds.

The reference current value may be determined from an experiment, for example by referring to a calibration curve or an abacus that shows whether the at least one secondary cell 110 is defective or not depending on the measured current value.

The inspection apparatus 1 may allow the inspection of many secondary cells 110 simultaneously.

Figure 5:
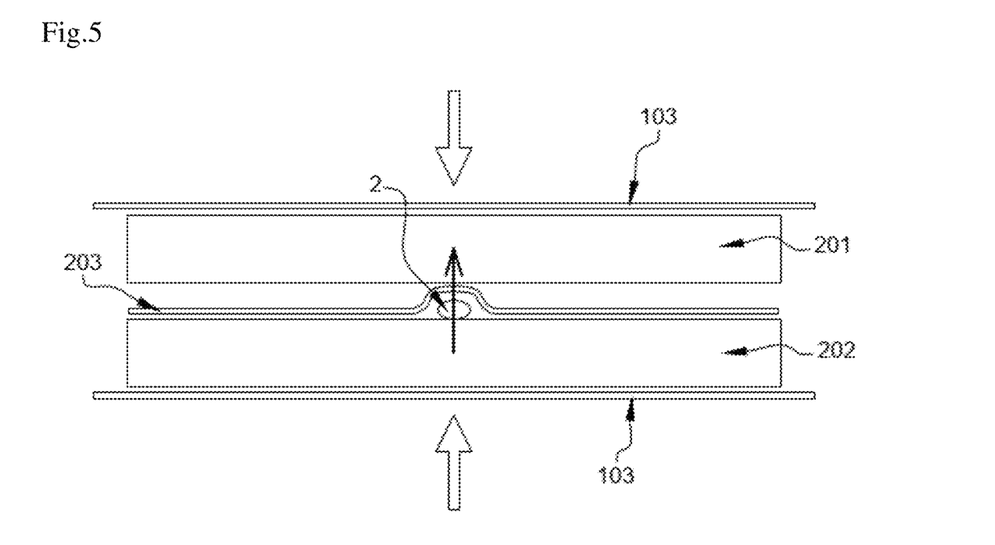
FIG. 5 is a schematic view of the interior of at least one secondary cell that is pressurized within the inspection apparatus.

The inspection apparatus 1 is intended to pressurize the at least one secondary cell 110 to allow or improve physical contact between the first electrode 201 and the second electrode 202 across the contaminant 2 in order to induce an electric current that flows through the contaminant 2 between the first electrode 201 and the second electrode 202.

As can be seen in FIG. 5, the pressure applied to the at least one secondary cell 110 improves the detection of a potential contaminant 2 inside the at least one secondary cell 110; the current flowing through the contaminant 2 is therefore easier to detect.

The first electrode 201 may be a cathode and the second electrode 202 may be an anode or vice versa.

The operation of the inspection apparatus 1 will now be described.

When the at least one secondary cell 110 is introduced into the inspection apparatus 1, the movable element 102, installed to face the support element 101, is displaced in the first direction and in the second direction along the main axis X by the drive unit 105 to pressurize and depressurize the pressing elements 103.

The movable element 102 is displaced in the first direction along the main axis X in order to pressurize the at least one secondary cell 110. A predetermined potential is applied to the cell and the current in the at least one secondary cell 110 is then measured, then the movable element 102 is displaced in the second direction along the main axis X after the measurement of the current in order to release the at least one secondary cell 110.

The movable element 102 is movable in translation in the first direction and the second direction, between a first position and a second position. The first position corresponds to the first state in which the cells are pressed by the drive unit 105, and the second position corresponds to the second state in which the cells are released by the drive unit 105.

The pressing elements 103 pressurize the body part of the at least one secondary cell 110. Here, the body part refers to the body part of the at least one secondary cell 110, excluding the electrode terminal protruding from the at least one secondary cell 110.

When the pressing elements 103 pressurize the at least one secondary cell 110, the pressure measuring unit can be interposed between the fixed element and the support frame to measure the pressure.

If the pressure applied to the at least one secondary cell 110 is too high, the electrode may be detached or the appearance of the at least one secondary cell 110 may be damaged. On the contrary, if the pressure is too low, the first electrode 201 and the second electrode 202 may not be physically in contact with each other through the contaminant 2, so that an internal short circuit may not be triggered, which decreases the reliability of the fault detection. Thus, by detecting the pressure applied to the at least one secondary cell 110 via the pressure sensor 106, it is possible to check whether an appropriate level of pressure is applied.

A voltage is then applied by the current control unit in order to perform a current control of the at least one pressurized secondary cell 110. For this purpose, the power source comprised in the current control unit applies a voltage across the electrode module in order to reach a predetermined voltage value, and the current measuring unit measures the value of the current flowing through the at least one secondary cell 110.

The current control unit and the electrode module can be electrically connected by a cable, or any other electrical connection means.

The electrode module electrically connects the current control unit to the at least one secondary cell 110. The electrode module can be attached to the inspection apparatus 1. The electrode module is connected to each of the electrode terminals of the at least one secondary cell 110 and applies the current applied by the current control unit to the at least one secondary cell 110, or transfers the current from the at least one secondary cell 110 to the current control unit.

Since the measured current is sensitive to temperature variations, the temperature of the at least one secondary cell 110 is measured using the temperature sensor 109 comprised in each pressing element 103 that is in contact with the at least one secondary cell 110. By means of the current correction unit, it is possible to obtain a corrected measured current value taking into account the temperature dependence of the current. This makes it possible to compare the corrected current value with the reference current value while taking into account the temperature of the cell, and helps to avoid sorting errors.

Then, the controller that is connected to the drive unit 105, the electrode module, and the current correction unit compares the corrected current value obtained by the current correction unit and the reference current value in order to determine whether or not there is a fault. Furthermore, the controller can compare the corrected current value of the at least one secondary cell 110 measured by the current control unit with a predetermined reference value of a good product and determine whether the value is acceptable according to the predetermined criteria. The result of the determination can be displayed by a display unit not shown.

The controller therefore determines whether the at least one secondary cell 110 is good or not according to whether the value measured according to the measured electricity quantity or the insulation degree corresponds to a predetermined standard and can enable the display unit or a data output device to display the result of the determination for at least one secondary cell 110.

The disclosure also concerns an inspection method for inspecting at least one secondary cell 110. An embodiment of the inspection method is illustrated on FIG. 6.

Figure 6:
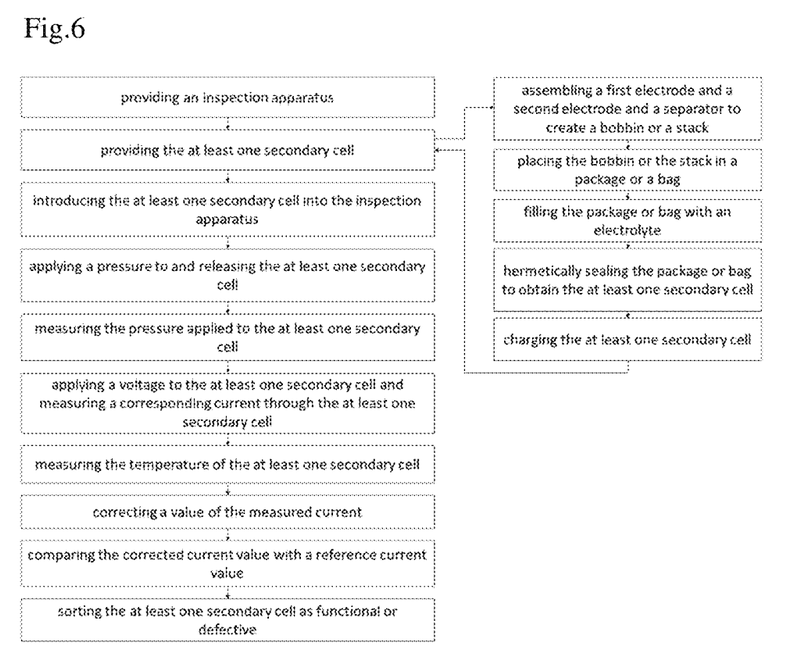
FIG. 6 is a schematic view of an inspection method according to one embodiment of the invention.

The inspection method comprises a step of providing an inspection apparatus 1 as described above and a step of providing the at least one secondary cell 110 to be inspected.

In order to provide the at least one secondary cell 110 to be inspected, the following sub-steps may be performed:
  assembling at least the first electrode 201 and the second electrode 202 and a separator 203 interposed between the first electrode 201 and the second electrode 202 in order to create a bobbin or a stack;
  placing the bobbin or the stack in a package or a bag;
  filling the package or the bag with an electrolyte;

hermetically sealing the package or the bag in order to obtain the at least one secondary cell 110;

charging the at least one secondary cell 110 to a predetermined state of charge in order to form a solid electrolyte interphase on the surface of the first electrode 201 before placing the at least one secondary cell 110 in the inspection apparatus.

According to one possibility, a bobbin or a stack can be created by assembling many first electrodes, many second electrodes, many separators and other additional layers.

Then, once the inspection apparatus 1 and the at least one secondary cell 110 to be inspected are provided, the following steps are performed:

introducing the at least one secondary cell 110 into the inspection apparatus 1 such that the at least one secondary cell 110 is introduced between two adjacent pressing elements 103;

applying a pressure to and releasing the at least one secondary cell 110 between the pressing elements 103 on both sides by displacing the movable element 102 relative to the support element 101 along a main axis X in the first direction and the second direction opposite to each other along the main axis X;

measuring the pressure applied to the at least one secondary cell 110 using the pressure measuring unit in order to determine whether the applied pressure is within a predefined pressure range which can be comprised between 200 and 5000 kgf/cm2;

applying a voltage to the at least one secondary cell 110 and measuring a corresponding current through the at least one secondary cell 110;

measuring the temperature of the at least one secondary cell 110 with a temperature sensor 109 comprised in each pressing element 103 which is in contact with the at least one secondary cell 110 which is subjected to pressure by the pressing elements 103;

correcting a value of the measured current by taking into account the measured temperature value of the at least one secondary cell 110 by the temperature sensor 109.

Then, in order to sort the at least one secondary cell 110 as functional or defective, the following steps can be performed:

comparing the corrected current value with a reference current value;

sorting the at least one secondary cell 110 as functional or defective based on the comparison between the corrected current value and the reference current value such that:

if the corrected current value exceeds the reference current value, the at least one secondary cell 110 is considered defective, if the corrected current value is lower than the reference current value, the at least one secondary cell 110 is considered functional.

The pressure sensor 106 makes it possible to check whether the applied pressure value is appropriate or not.

Advantageously, the described inspection method makes it possible to take into account the temperature dependence of the current measured through the at least one secondary cell 110, and to correct the measured current before comparing it to a reference value.

The measured current flowing through the secondary cell depends on the temperature and will therefore be measured more accurately using the described inspection method.

The described inspection method allows more precise sorting of the at least one inspected secondary cell 110.

Advantageously, the inspection method can be applied during a manufacturing process of the at least one secondary cell 110 after an electrolyte impregnation phase, and before a first charge of the at least one secondary cell 110.

Advantageously, the inspection method can be applied after the formation of the cell.

The inspection method and apparatus described above have an industrial application in the field of manufacturing secondary cells.

What applies in this detailed description to the inspection method also applies to the inspection apparatus, and vice versa.

The invention claimed is:

1. An inspection apparatus for inspecting at least one secondary cell, the inspection apparatus comprising:
   a fixed support element;
   a movable element installed to face the support element and being movable relative to the fixed support element along a main axis in a first direction towards the support element and a second direction opposite the first direction, each direction being along the main axis;
   pressing elements installed between the support element and the movable element, said pressing elements being freely movable along the main axis,
   each pair of pressing elements defining a space configured to receive a secondary cell of the at least one secondary cell;
   a drive unit configured to operate in a first state in which the drive unit presses the at least one secondary cell which is located between the pressing elements on both sides, and a second state in which the drive unit releases the at least one secondary cell;
   a pressure measuring unit comprising a pressure sensor comprised between a pair of pressing elements among the pressing elements, the pressure measuring unit being configured to measure the pressure applied by the drive unit;
   a current control unit comprising a power source configured to apply a voltage to the at least one secondary cell and a current measuring unit electrically connected to the current control unit for measuring a corresponding current through the at least one secondary cell;
   each pressing element of the pressing elements further comprises a temperature sensor, the temperature sensor being configured to measure the temperature of the at least one secondary cell which is subjected to a pressure between each pair of pressing elements of the pressing elements; and
   a current correction unit configured for correcting the current measured by the current measuring unit based on a current calibration.

2. The inspection apparatus according to claim 1, further comprising a guide member configured to guide each pressing element of the pressing elements to be displaced along the main axis freely in a first direction and in a second direction.

3. The inspection apparatus according to claim 1, wherein the temperature sensor is chosen from the group consisting of: a thermocouple, a resistance temperature detector, a thermistor, and an integrated circuit temperature sensor.

4. The inspection apparatus according to claim 1, wherein the temperature sensor has a resolution comprised between 0.05° C. and 0.5° C.

5. The inspection apparatus according to claim 1, wherein the temperature sensor has an operating temperature range comprised between 5° C. and 120° C.

6. The inspection apparatus according to claim 1, further comprising an electrode module configured to be electrically connected to electrode terminals of the at least one secondary cell to apply or receive current.

7. The inspection apparatus according to claim 1, comprising a frame configured to be installed on a support, the support element being installed perpendicular to the frame, wherein the frame comprises a chassis resting on the support and a pair of support frames provided on either side of the chassis to face each other; wherein
the pressure measuring unit comprises a pressure sensor interposed between a fixed element fastened to face the support element and the support frame provided on one side of the chassis,
the pressure sensor configured to measure a pressure when the pressing elements pressurize the at least one secondary cell when the drive unit is in a first operating state.

8. The inspection apparatus according to claim 1, wherein the pressure measuring unit comprises a pressure sensor comprised between two adjacent pressing elements of the pressing elements.

9. An inspection method for inspecting at least one secondary cell, the inspection method comprising the following steps:
providing an inspection apparatus comprising:
a fixed support element;
a movable element installed to face the support element and being movable relative to the fixed support element along a main axis in a first direction towards the support element and a second direction opposite the first direction, each direction being along the main axis;
pressing elements installed between the support element and the movable element, said pressing elements being freely movable along the main axis, each pair of pressing elements defining a space configured to receive a secondary cell of the at least one secondary cell;
a drive unit configured to operate in a first state in which the drive unit presses the at least one secondary cell which is located between the pressing elements on both sides, and a second state in which the drive unit releases the at least one secondary cell;
a pressure measuring unit comprising a pressure sensor comprised between a pair of pressing elements among the pressing elements, the pressure measuring unit being configured to measure the pressure applied by the drive unit;
a current control unit comprising a power source configured to apply a voltage to the at least one secondary cell and a current measuring unit electrically connected to the current control unit for measuring a corresponding current through the at least one secondary cell
each pressing element of the pressing elements further comprises a temperature sensor, the temperature sensor being configured to measure the temperature of the at least one secondary cell which is subjected to a pressure between each pair of pressing elements of the pressing elements,
a current correction unit for correcting the current measured by the current measuring unit based on a current calibration;
providing the at least one secondary cell to be inspected;
introducing the at least one secondary cell into the inspection apparatus between two adjacent pressing elements;
applying a pressure to and releasing the at least one secondary cell between the pressing elements on both sides by displacing the movable element relative to the support element along the main axis in a first direction and a second direction opposite to each other along the main axis;
measuring the pressure applied to the at least one secondary cell using the pressure measuring unit in order to determine whether the applied pressure is within a predefined pressure range;
applying a voltage to the at least one secondary cell and measuring a corresponding current through the at least one secondary cell;
measuring the temperature of the at least one secondary cell with the temperature sensor comprised in each pressing element which is in contact with the at least one secondary cell;
correcting a value of the measured current based on a current calibration curve by taking into account the measured temperature value of the at least one secondary cell by the temperature sensor;
comparing the corrected current value with a reference current value; and
sorting the at least one secondary cell as functional or defective based on the comparison between the corrected current value and the reference current value
whereby:
if the corrected current value exceeds the reference current value, then the at least one secondary cell is considered defective, and
if the corrected current value is lower than the reference current value, then the at least one secondary cell is considered functional.

10. The inspection method according to claim 9, wherein the step of providing the at least one secondary cell comprises:
assembling a first electrode and a second electrode and a separator interposed between the first electrode and the second electrode to create a bobbin or a stack;
placing the bobbin or the stack in a package or a bag;
filling the package or bag with an electrolyte;
hermetically sealing the package or bag to obtain the at least one secondary cell; and
charging the at least one secondary cell to a predetermined charge state to form a solid electrolyte interphase on the surface of the first electrode before placing the at least one secondary cell in the inspection apparatus.

* * * * *